H. ELLIS.
RIBBON WINDING AND REVERSING MECHANISM.
APPLICATION FILED NOV. 5, 1910.
1,018,176.
Patented Feb. 20, 1912.
2 SHEETS—SHEET 1.
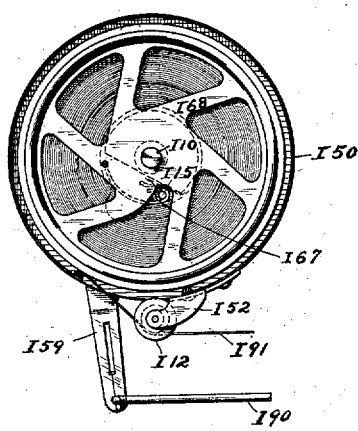
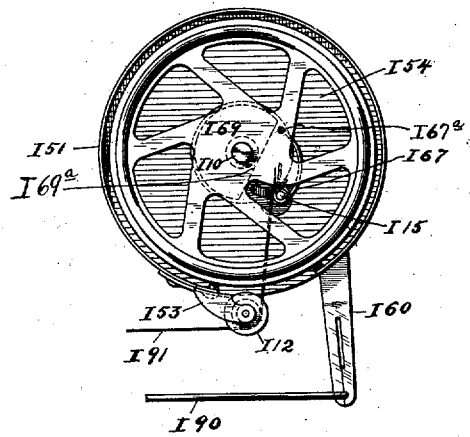
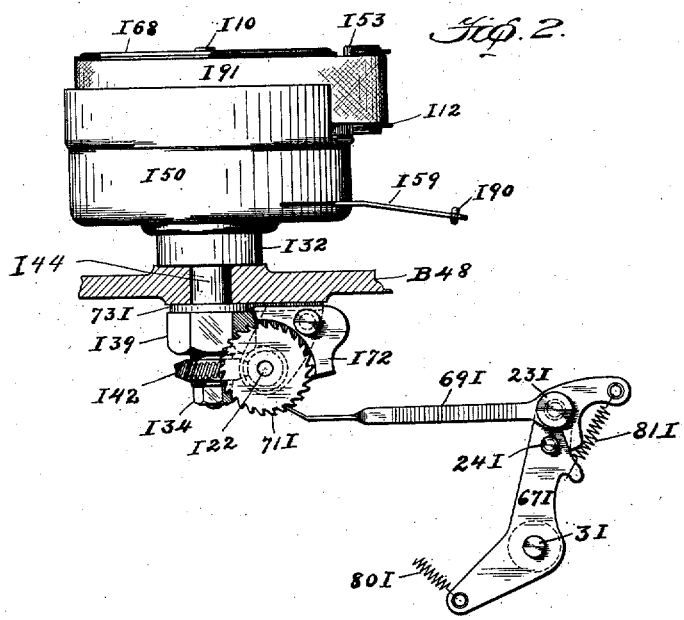
WITNESSES:
INVENTOR
Halcolm Ellis
BY
ATTORNEY

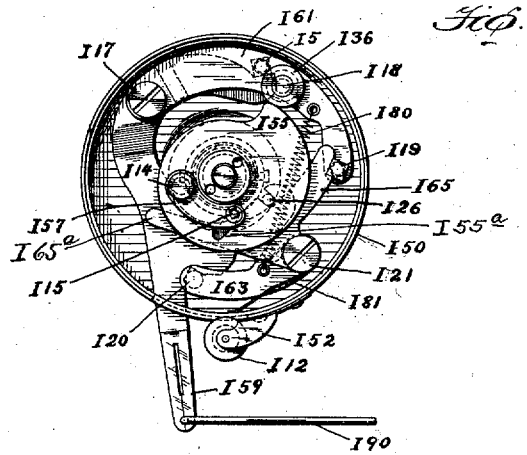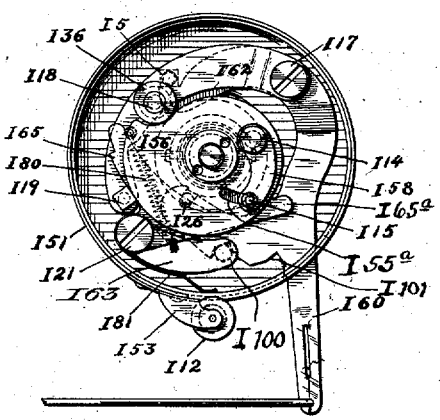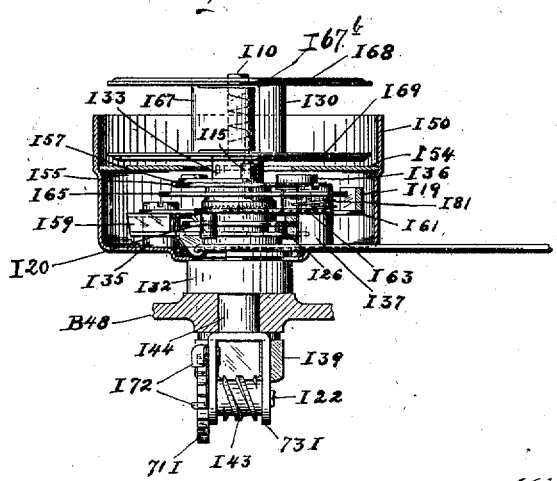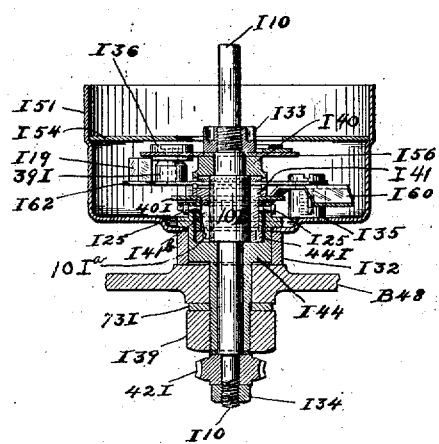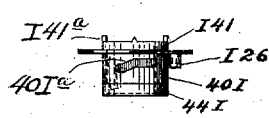

UNITED STATES PATENT OFFICE.

HALCOLM ELLIS, OF EAST ORANGE, NEW JERSEY.

RIBBON WINDING AND REVERSING MECHANISM.

1,018,176.   Specification of Letters Patent.   Patented Feb. 20, 1912.

Application filed November 5, 1910. Serial No. 590,951.

*To all whom it may concern:*

Be it known that I, HALCOLM ELLIS, a citizen of the United States, residing at East Orange, county of Essex, and State of New Jersey, have invented certain new and useful Improvements in Ribbon Winding and Reversing Mechanism, of which the following is a specification.

This invention relates to ribbon winding and reversing mechanism.

The present invention has for its object the provision of a novel winding and reversing mechanism for the ribbons of typewriters, calculating machines, and the like, wherein the driving spindles of the reels will always be positively driven and the reels or spools will be alternately clutched to their spindles, according to the direction of travel of the ribbon, the spool or reel on which the ribbon is winding being positively driven by its spindle and the reel or spool from which the ribbon is being unwound turning idly or loosely on its spindle. These results are obtained by the employment of a ribbon reel or spool provided with a device which is actuated by the ribbon when unwound, or substantially so, which is tensioned at that time, and certain clutch-operating mechanism of novel construction which is tripped by such action so that the ribbon reel or spool is engaged with its spindle and positively driven thereby, causing the unwound ribbon to begin to wind thereupon, such action causing release of the clutch of the other ribbon reel or spool so that the latter will then turn loosely on its spindle. Certain parts of the mechanism of the two reels or spools are coupled so that they are operated to accomplish the above described results.

In the accompanying drawings: Figure 1 is a plan view of a complete ribbon winding and reversing mechanism made in accordance with the present invention, the spool at the right which has previously been turning loosely, having just caused setting of the clutch so that it will immediately rewind the ribbon; Fig. 2, an elevation of the left-hand mechanism of Fig. 1, showing the operating means for the same, whereby both of the spindles of the reels are positively driven without reversal; Fig. 3, a view with the parts in the position shown in Fig. 1, the reels being removed; Fig. 4, a view in elevation of the mechanism at the left of Fig. 3, the ribbon cup or shell and the frame being in section; Fig. 5, a vertical section of the mechanism at the right of Fig. 3; and Fig. 6, a detail of the movable part of the clutch.

The respective mechanisms are of the same construction and operation, but are reversely arranged.

The frame which carries the mechanism is shown at B48, through which extend the stems I44, screw-threaded at their lower ends and securely clamped by the nuts and washers I39 and 731. The upper part of the stem I44 is of cup shape and provided with, preferably diametrically oppositely disposed screws or pins I25. This cup-shaped head preferably clamps, by the annular flange thereon, Fig. 5, the cup or shell I50, or I51, against a collar or sleeve I32 interposed between said cup and the frame B48. On loosening the nut I39, the parts can be readily separated.

Extending upwardly through the stem I44, is a spindle I10, free to turn within said stem as its bearing. Secured on the reduced screw-threaded lower ends of the spindles I10 by nuts I34 are the respective worm gears I42 and I21, Figs. 2 and 5. Journaled in a bracket 731, Fig. 4, is a worm wheel or pinion I43 on a shaft I22 which shaft carries a ratchet wheel 71I. The worm wheel or pinion I43 meshes with the worm gear I42. The worm wheels I42 and 42I may be coupled for simultaneous turning by a cross-shaft and pinion, not shown, and the spindles I10 will thus be positively driven at all times, always turning in opposite directions, but each spindle may be turned by its own worm and ratchet wheel without this cross shaft.

Any suitable mechanism may be employed for turning the ratchet wheel 71I step by step, a convenient form being that shown in Fig. 2 and comprising the rocker 67I pivotally mounted by a shaft 31, retracted by a spring 80I and carrying on a pivot 23I a pawl 69I which is connected to the rocker by a spring 81I and whose movement is limited by a stop 24I. The shaft 31 and rocker 67I may be operated in any desired manner. For instance, in using the invention on a typewriter, a lever may be secured to shaft 31 against which the universal bar of the typewriter strikes so that each time a key is depressed, the rockers 67I will be moved. If the invention is used on an adding or calculating machine, a lever secured on shaft 3I may be moved from the mechanism of the printing section of the machine. Two rockers 67I secured to the same shaft 3I may be employed in connection with independent pawls 69I and ratchet wheels 71I, one set for each spindle I10, thereby dispensing with a cross shaft and worms for the worm wheels I42 and 42I. Other means of moving the rocker 67I may be employed.

An enlarged part 10I of the spindle is provided with a key-way extending longitudinally thereof, as shown by dotted lines 10I$^a$. Loose on the part 10I so as to be capable of sliding longitudinally thereon, is a clutch I41 (Fig. 6) which has points I41$^a$ at its upper end and is provided with an internal struck-up tongue I41$^b$ which is received in the key-way 10I$^a$ so that this clutch is adapted to slide longitudinally of the enlarged part 10I of the spindle. The lower end of the clutch has an annular shoulder 44I and there is an annular shoulder or flange on the upper end of the said clutch. Loosely surrounding the clutch and confined between the aforesaid shoulders or flanges is a sleeve 40I which is provided with cam slots 40I$^a$ receiving the ends of the pins or screws I25. The sleeve 40I has a flange from which depends a stud or pin I26. It will be obvious that when the sleeve 40I is turned in one direction, the engagement of the pins I25 with the slots 40I$^a$ will cause the clutch I41 to be raised and when said sleeve is turned in the opposite direction, the clutch and sleeve will be lowered.

The clutch I41 revolves continuously with the spindle I10 at whatever position it may be disposed in by moving the sleeve 40I. The movement of the sleeve is accomplished by the lever I59 on one of the mechanisms and I60 on the other, the two levers being connected by a rod I90 so that they will move together. The said levers I59 and I60 are pivoted on screws or other suitable pivots I17 on the cups or shells I50, I51. The rear end of each lever is shaped to engage a pin I5 (Fig. 3) carried by the latching arms I61, I62, which are respectively pivoted on the screws or pivots I17 and are provided with latching pins I19 serving a purpose hereinafter specified. The latching arms I61, I62, have rollers or bowls I36 on pins I18, and said latching arms are actuated by springs I80. The springs I80 are connected, in each instance, to a pawl I63 which is pivoted on a pin or screw I21 on the shell I51 and carries on its free end a stud I20 designed to engage with one or the other of the notches I100, I101 on the arm of lever I59, I60, the spring I80 tending to throw the stud I20 into one or the other of said notches. The same arm of lever I59, I60 which has the notches I100, I101, is provided with a notch which engages the stud or pin I26 on the sleeve or collar 40I. It will, therefore, be apparent that when the levers I59, I60 are moved, both of the sleeves 40I are turned and both of the clutches I41 are shifted longitudinally of the spindles I10, the arrangement of the parts being such that when one of said clutches I41 is raised, the other clutch is lowered and the arrangement of the parts is such that the stud I20 will be in the notch I100 of one of the levers when the other stud I20 is in the notch I101 of the other lever, thus locking the parts in the positions to which they have been set.

Pivoted on the screws or pins I21 are detents I65 of substantially bell-crank shape, one of the arms thereof being provided with a notch adapted to receive the stud I19 to lock the parts in the position shown at the left-hand side of Fig. 3, the spring I81 which is coiled around the stud or pin I21, tending to position the detent I65 so that the notched end thereof will snap into engagement with the stud I19.

Referring to Fig. 5, there is secured on spindle I10 so as to be free to revolve thereon a clutch member I40 whose lower edge is provided with numerous serrations or teeth, as is clear from Figs. 4 and 5. The serrations of one clutch I40 are engaged with the points I41$^a$ (Fig. 6) of the clutch member I41 of that mechanism which is winding a ribbon. The clutches I40 and I41 of the other ribbon mechanism, the one from which the ribbon is being unwound, are disengaged. This condition of the clutches is reversed as the ribbon winds from one reel onto the other. The clutch I40 is held in position on the spindle I10 by a nut I33. Integral with or suitably connected to the clutch I40 is a cam I55, I56 which is so disposed that it is adapted to coöperate with the bowl I36, as will appear from Fig. 3. Pivoted at I14 to the cam I55, I56, is a detent I57, I58, which carries a pin I15 (Figs. 1, 3 and 4), the said pin extending both above and below the cam, its lower part passing through a slot I55$^a$ in the cam and in position to press against the arm I65$^a$ of the detent I65 for the purpose of releasing said detent from the stud I19 which action is brought about when the reel or spool is unwound, but not otherwise, as will now appear.

Preferably the reel-receiving cup of the casing I50 is separated from the mechanisms heretofore described by a partition I54. The reels or spools I68, I69, (Fig. 1) are mounted on the respective spindles I10. The reels may be of the ordinary construction except for the ribbon clamp I67 which is pivoted to the reel at I67$^a$ and is looped at its free end to receive the upwardly projecting part of the pin I15 so that the cam 155, 156, always turns with the reel whether it is winding up or lettering off the ribbon. The ribbon clamp 167 is provided with points 167ᵇ (Fig. 4) on its looped end which are engaged with the end of the ribbon. The hub of the reel, between the heads or flanges thereof is flattened or cut away, as shown at 169ᵃ and the ribbon clamp 167, being curved, when closed completes the circle of the hub so that the ribbon winds therearound when it is being wound on the spool or reel. This condition is shown in the spool at the left of Fig. 1. The position of the clamp when the ribbon has been completely unwound therefrom is shown at the right of Fig. 1. The tension of the ribbon 191 causes the ribbon clamp to be pulled outwardly as shown, which effects reversal of the winding so that the ribbon which has previously wound on the left-hand spool, will wind on the right-hand spool, as will presently appear. The ribbon travels over antifriction rollers 112 on brackets 152, 153, which are secured to the shell or case 150, 151.

Referring first to Fig. 1, the ribbon has wound on the left-hand reel and completely unwound from the right-hand reel, the tension of the ribbon having pulled the ribbon clamp 167 from its normal position of rest against the flattened surfaces 169ᵃ. Immediately previous to the tension of the ribbon causing the ribbon clamp to move outwardly, the latching lever 160 was in a position more to the left, the stud 120 lying in the notch 1101 of said right-hand ribbon mechanism, at which time the end of detent 165 was engaged with stud 119 and the end of the lever 160 was against the stud or pin 15. The parts were then disposed as shown at the left of Fig. 3. The clutch 141 of the right-hand ribbon mechanism of Fig. 1 was then lowered out of engagement with the clutch 140 and, consequently, the continued rotation of spindle 110 of the right-hand ribbon mechanism had no effect on the cam 156 which was free to swing around as the ribbon unwound from the reel 169. Being compressed by the layers of ribbon wound therearound, the ribbon clamp 167 was pressed flat against the flattened part 169ᵃ and, consequently, the lower part of the pin 115 was not in position to engage the arm 165ᵃ of the detent 165. Hence, as the ribbon unreeled from said right-hand reel 169 and wound onto the reel 168, there was no operation of the parts of said right-hand reel. On the contrary, the left-hand ribbon mechanism of Figs. 1 and 3 was arranged as shown by the right-hand mechanism of Fig. 3, the stud 120 being in the notch 1100 of said left-hand ribbon mechanism and the clutch 140 being engaged by the clutch 141, which was raised into engagement therewith by reason of the position of the lever 159.

As soon as the ribbon was completely wound on the left-hand reel of Fig. 1, the tension of said ribbon pulled the ribbon clamp 167 to the position shown. The lower end of pin 115 thereupon released the detent 165 from the stud 119, whereupon the spring 180 snapped the arm 162 inwardly and such action by means of pin 115 on the arm 162 and the action of the spring 180 moved the lever 160 to the full line position at the right of Fig. 1, the parts then being in the position shown at the right of Fig. 3. As soon as this condition prevailed, the clutching of the members 140 and 141 of the right-hand ribbon mechanism caused the spool 169 to be positively turned in the reverse direction from that in which it was previously unreeling the ribbon and the coupling of the levers 159 and 160 by the rod 190 shifted said lever 159 so that the parts were restored and latched as shown by the left-hand ribbon mechanism of Fig. 3. This movement of lever 159 caused the lowering of the clutch 141 of the left-hand ribbon mechanism, and hence the left-hand reel 168, Fig. 1, became loose on its spindle 110, and the ribbon then unwound from said left-hand spool onto the right-hand spool. The cams 155 and 156 restore the latching arms 161 and 162 to the position shown at the left of Fig. 3, when the reel of the given latching arm begins to wind up the ribbon. Thus, the ribbon will wind from one spool onto the other and automatically reverse, the spindles always positively turn and one reel be clutched to its spindle wl. the other is loose on its spindle.

Having thus described my invention, what I claim as new and desire to secure by Letters Patent, is:—

1. In a ribbon winding and reversing mechanism, the combination with ribbon reels or spools, of driving devices for the respective spools each of which is arranged to always rotate in the same direction, means for engaging the respective reels with said driving devices, an operative connection between said engaging means of the respective spools, whereby when one spool is engaged with its driving device the other is disengaged from its own driving device, shiftable ribbon attaching devices carried by the ribbon reels, and means operated by the movement of the ribbon attaching devices on the unwinding of the ribbon for reversing the condition of the engaging devices aforesaid at predetermined times.

2. In a ribbon winding and reversing mechanism, the combination of spindles, means for turning said spindles, ribbon reels loosely mounted on the spindles, clutches for engaging the respective reels with their spindles so that they will be driven thereby, operatively connected shifters for the respective clutches arranged so that when one of the reels is clutched to its spindle, the other reel is loose on its spindle, and shiftable ribbon attaching devices carried by the reels and operated by the unwinding of the ribbon thereof adapted to reverse the condition of the respective clutches.

3. In a ribbon winding and reversing mechanism, the combination of spindles, means for turning said spindles, ribbon reels loosely mounted on the spindles, clutches for engaging the respective reels with their spindles so that they will be driven thereby, operatively connected shifters for the respective clutches arranged so that when one of the reels is clutched to its spindle, the other reel is loose on its spindle, and movable ribbon clamps securing the ribbon to the respective reels which are arranged to effect reversal of the condition of the respective clutches when the ribbon is unwound.

4. In a ribbon winding and reversing mechanism, the combination of spindles, means for turning said spindles, ribbon reels loosely mounted on the spindles, clutches for engaging the respective reels with their spindles so that they will be driven thereby, operatively connected shifters for the respective clutches arranged so that when one of the reels is clutched to its spindle, the other reel is loose on its spindle, and ribbon clamps pivoted to the respective reels and connecting the ribbon to said reels, said clamps being coöperatively related to the clutch shifting means and adapted to effect reversal of the condition of the clutches when the ribbon is unwound.

5. In a ribbon winding and reversing mechanism, the combination with ribbon reels or spools, of driving devices for the respective spools each of which is arranged to always rotate in the same direction, a spring-actuated tripable snap mechanism for each of the reels adapted for engaging the reel with its driving device when released, an operative connection between said spring-actuated snap mechanisms of the respective spools whereby when one spool is engaged with its driving device the other is disengaged from its own driving device, and means operated by the ribbon for setting one of the snap mechanisms aforesaid and releasing the other of them.

6. In a ribbon winding and reversing mechanism, the combination of spindles, means for turning said spindles, ribbon reels loosely mounted on the spindles, clutches for engaging the respective reels with their spindles so that they will be driven thereby, operatively connected shifters for the respective clutches arranged so that when one of the reels is clutched to its spindle the other reel is loose on its spindle, spring-actuated tripable snap mechanisms for the respective shifters one of which is set and the other tripped at the same time, and means operated by the ribbon adapted for operating said snap mechanisms.

7. In a ribbon winding and reversing mechanism, the combination with a ribbon reel or spool, of a driving device therefor, means for engaging the driving device with the spool or reel so that the latter will rotate therewith, a movable member for effecting the engagement and release of the said parts, a spring-actuated latching arm adapted, when released, to shift the member aforesaid, a detent or trip adapted to be engaged by the latching arm aforesaid, a restoring device for the latching arm which is rotatable with the reel or spool, and a releasing member adapted to disengage the trip or detent from the latching member to permit the latter to shift the movable member aforesaid.

8. In a ribbon winding and reversing mechanism, the combination with a ribbon reel or spool, of a driving device therefor, means for engaging the driving device with the spool or reel so that the latter will rotate therewith, a movable member for effecting the engagement and release of the said parts, a spring-actuated latching arm adapted, when released, to shift the member aforesaid, a detent or trip adapted to be engaged by the latching arm aforesaid, a restoring device for the latching arm which is rotatable with the reel or spool, a movable member on the spool or reel which is arranged to be shifted by the ribbon which is adapted, when shifted, to release the detent from the latching arm.

9. In a ribbon winding and reversing mechanism, the combination with a ribbon reel or spool, of a driving device therefor, means for engaging the driving device with the spool or reel so that the latter will rotate therewith, a movable member for effecting the engagement and release of the said parts, a spring-actuated latching arm adapted, when released, to shift the member aforesaid, a detent or trip adapted to be engaged by the latching arm aforesaid, a cam for restoring the latching arm, a movable releasing member carried by the cam and adapted to engage the detent to release it from the latching arm, and means actuated by the movement of the ribbon adapted to shift the said releasable member to disengage the detent from the latching arm.

10. In a ribbon winding and reversing mechanism, the combination with a ribbon reel or spool, of a driving device therefor, a clutch adapted for engaging the driving device and reel or spool, a spring-snap tripable mechanism for shifting the clutch, and means operated by the movement of the ribbon adapted to trip said spring-snap mechanism.

11. In a ribbon winding and reversing mechanism, the combination with a ribbon reel or spool, of a driving device therefor, a clutch adapted for engaging the driving device and reel or spool, a snap-acting tripable mechanism for shifting the clutch, means operated by the movement of the ribbon adapted to trip said snap mechanism, and a restoring device operated by the movement of the reel or spool adapted to reset said snap mechanism.

12. In a ribbon winding and reversing mechanism, the combination with a ribbon reel or spool, of a driving spindle, a clutch for engaging the reel or spool with the spindle so that it will be driven thereby, a clutch shifter, a spring-actuated latching arm adapted to coöperate with the clutch shifter, a detent or trip for holding the latching arm in set position, a cam movable with the reel or spool adapted for restoring the arm to normal position, a releasing member carried by the cam adapted to disengage the detent from the arm, and a movable device on the reel which is adapted to move the releasing device and is itself adapted to be shifted by the movement of the ribbon on the reel to thereby cause release of the detent and snap operation of the clutch shifter.

13. In a ribbon winding and reversing mechanism, a ribbon spool, a ribbon clamp mounted in said spool on pivots eccentrically placed whereby the clamp may swing outward from the hub thereof, a constantly driven spindle, a clutch for engaging the spindle to mechanism for turning the spool and means operated by the ribbon clamp for causing the clutch to so engage.

14. In a ribbon winding and reversing mechanism, a ribbon spool, a ribbon clamp permanently carried by said spool on pivots eccentrically placed whereby said clamp may swing outward from the hub of the spool, and means for driving the spool, the engagement of said driving means with the spool being controlled by the ribbon clamp.

In testimony whereof, I hereunto affix my signature in presence of two witnesses.

HALCOLM ELLIS.

Witnesses:
W. C. DOUGLAS,
ISABEL NICHOLSON.

---

Copies of this patent may be obtained for five cents each, by addressing the "Commissioner of Patents, Washington, D. C."